United States Patent [19]

Miyaguchi et al.

[11] Patent Number: 5,711,188
[45] Date of Patent: Jan. 27, 1998

[54] INTERNAL-CIRCULATION-TYPE BALL SCREW DEVICE

[75] Inventors: Kazuo Miyaguchi, Takasaki; Akio Sakai, Maebashi, both of Japan

[73] Assignee: NSK, Ltd., Tokyo, Japan

[21] Appl. No.: 638,723

[22] Filed: May 9, 1996

Related U.S. Application Data

[63] Continuation of Ser. No. 331,908, Oct. 31, 1994, abandoned.

[30] Foreign Application Priority Data

Dec. 27, 1993  [JP]  Japan .................... 5-348347

[51] Int. Cl.$^6$ .................................. F16H 25/24
[52] U.S. Cl. ........................ 74/459; 74/424.8 R
[58] Field of Search ................ 74/459, 424.8 R

[56] References Cited

U.S. PATENT DOCUMENTS

| | | | |
|---|---|---|---|
| 3,667,311 | 6/1972 | Wysong | 74/424.8 |
| 3,815,435 | 6/1974 | Eschenbacher et al. | 74/459 |
| 4,235,122 | 11/1980 | Walter | 74/459 X |
| 4,604,911 | 8/1986 | Teramachi | 74/459 X |
| 4,750,378 | 6/1988 | Sheppard | 74/459 X |
| 4,887,480 | 12/1989 | Pollo | 74/459 |
| 5,005,436 | 4/1991 | Brusasco | 74/459 |
| 5,063,809 | 11/1991 | Schlenker | 74/459 |

FOREIGN PATENT DOCUMENTS

| | | |
|---|---|---|
| 304 980 | 2/1973 | Austria . |
| 39 03 939 | 8/1988 | Germany . |
| 1 299 369 | 12/1972 | United Kingdom . |

OTHER PUBLICATIONS

Webster's New Universal Unabridged Dictionary, ©1994, p. 328.

*Primary Examiner*—Charles A. Marmor
*Assistant Examiner*—David M. Fenstermacher
*Attorney, Agent, or Firm*—Shapiro and Shapiro

[57] ABSTRACT

An internal-circulation-type ball screw having simple construction and high productivity is provided. A ball nut has one or more through holes and one or more constrictions, which are formed around its outer peripheral surface so as to span the openings of respective through holes. One or more deflectors are put in respective through holes and fixed by fitting corresponding deflector-locking springs onto the constrictions. Each deflector-locking spring is a thin plate spring having a substantially C-shaped cross section with a concave portion in the middle. When the deflector-locking spring is fitted onto the constriction, the concave portion thereof presses the deflector in the through hole toward the threaded shaft. Thus, the deflector is fixed to the ball nut.

8 Claims, 4 Drawing Sheets

INTERNAL-CIRCULATION-TYPE BALL SCREW DEVICE

This is a continuation of application Ser. No. 08/331,908 filed Oct. 31, 1994, now abandoned.

BACKGROUND OF THE INVENTION

1. Field of the Invention

The present invention relates to a ball screw device, more specifically, an internal-circulation-type ball screw device which circulates balls internally.

2. Related Background Art

Balls of a ball screw device can be circulated in a ball tube which is externally attached to the device the external circulation type. Or the balls may be circulated inside the device. FIG. 11 shows the cross-section of a typical example of such internal-circulation-type ball screw, in which balls 3 are circulated around the periphery of a threaded shaft 1 while led by a deflector 4 which is set in a ball nut 2. While the external-circulation-type ball screw devices are hard to miniaturize according to their construction, this internal-circulation-type ball screw device can be of small size with said construction. The deflector 4 which has one or more circulation paths for leading and circulating the balls has been fixed as follows. First the deflector 4 is pushed in a through hole 5 formed in the ball nut 2. Then, the deflector 4 is buried in the ball nut 2 by covering the outer surface of the deflector 4 with an adhesive 6 which is applicable to metals.

Also, fixation of the deflector 4 by thread fastening has been proposed.

According to the above-mentioned method, in which the deflector 4 is fixed to the ball nut 2 with the adhesive 6, it takes more than 10 hours for the adhesive 6 to cure. As a result, the bonding process becomes a bottleneck in manufacturing. Also, the bonding process is not easy to automate. In addition, among other problems, if the adhesive 6 flows out over the outer surface of the ball nut 2 and/or drops on wrong places in the bonding process, it has to be manually removed.

On the other hand, the proposed fixation of the deflector 4 by thread fastening can not be properly carried out when the entire ball nut 2 is subjected to quench hardening. Even if the fixation could be carried out properly, assembly processes would be more difficult.

SUMMARY OF THE INVENTION

The present invention was made in order to solve the above-mentioned problems. Thus an object of the present invention is to provide a ball screw whose construction is simple and which can increase its productivity.

An internal-circulation-type ball screw device according to the present invention has one or more deflectors which can lead and circulate a plurality of balls inside the device. The ball nut of this ball screw device has one or more through holes into which said deflectors are put. Also, one or more constrictions corresponding to respective through holes are formed around the outer peripheral surface of the ball nut so as to span the openings of their respective through holes. After putting the deflectors in the through holes, deflector-locking springs are fitted on the constrictions around the ball nut in order to fix the deflectors in the through holes of the ball nut. The deflector-locking spring is a thin plate spring having a substantially C-shaped cross section with a ditch-like portion or a corrugated portion in the middle. This ditch-like or corrugated portion serves as a pressure mechanism, that is, comes into contact with the top surface of the deflector and presses it downward when the deflector-locking spring is fitted on the constriction.

As described above, the deflectors are pressed into the through holes of the ball nut by the ditch-like or corrugated portions of the deflector-locking springs. Thus, reliable fixation can be obtained. In addition, the deflectors can be easily assembled into the device only by fitting the deflector-locking springs around the ball nut. At the same time, as the corrugated portions of thus attached deflector-locking springs are held in the through holes, rotation of the deflector-locking springs around the outer surface of the ball nut can be inhibited. Accordingly, ball screws can be assembled in a short time, and the deflectors can be easily detached.

DESCRIPTION OF THE PREFERRED EMBODIMENTS

Figure 1:
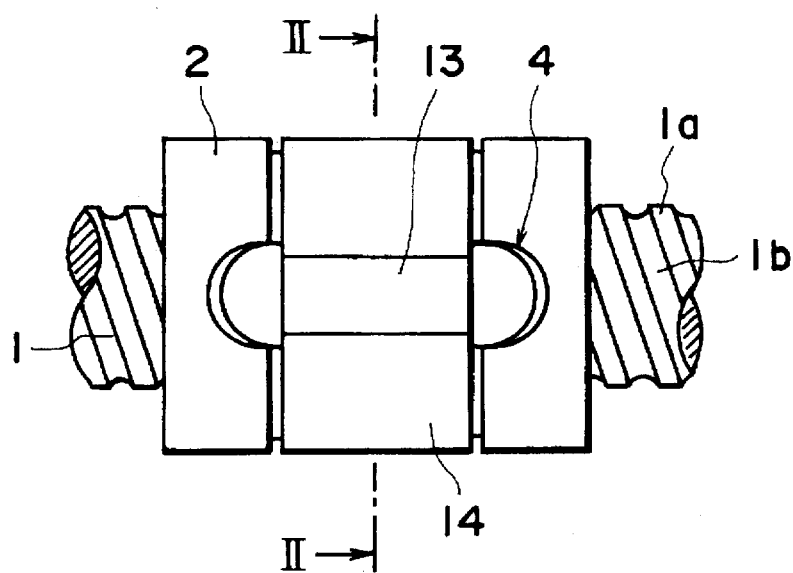
FIG. 1 is a plan view showing an embodiment according to the present invention.
Figure 2:
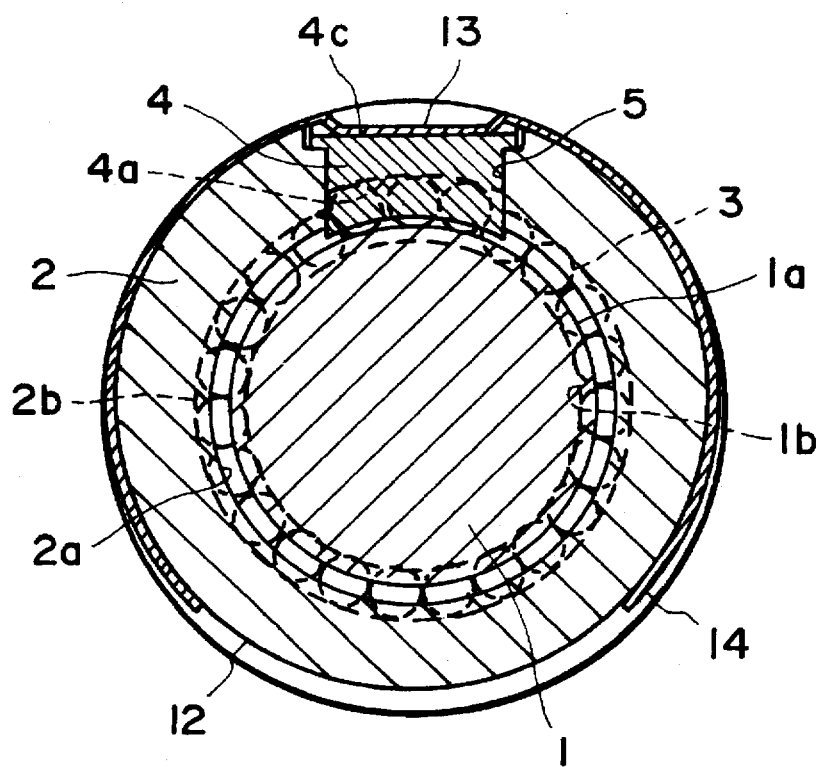
FIG. 2 is a cross-sectional view of the embodiment, showing the cross section cut along II—II in FIG. 1.
Figure 3:
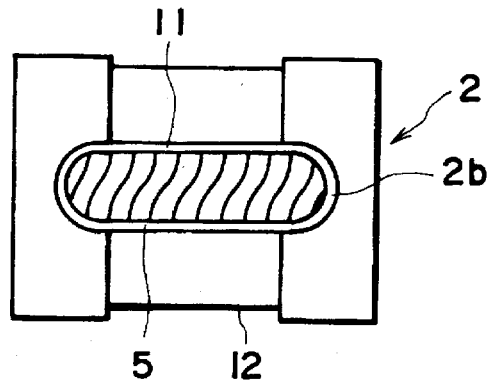
FIG. 3 is a plan view showing the ball nut of FIG. 1, wherein the other components are not shown.

Now, the present invention will be described in detail with reference to the preferred embodiments shown in the drawings, in which the same or similar components are indicated by the same reference numerals.

FIGS. 1–6 illustrate a first embodiment of the internal-circulation-type ball screw according to the present invention which is provided with a deflector.

Figure 4:
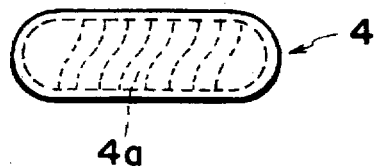
FIG. 4 is a plan view showing the deflector of FIG. 1, wherein the other components are not shown.
Figure 5:
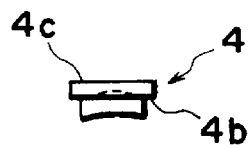
FIG. 5 is a front view of the deflector.

A threaded shaft 1 has spiral ball thread grooves 1b on its peripheral surface 1a (also referred as the lands). A ball nut 2 has ball thread grooves 2b to face to said ball thread grooves 1b of the threaded shaft 1 on its inner peripheral surface 2a. The ball nut 2, when assembled, engages with the threaded shaft 1 with plurality of balls 3 in between. The cylindrical main body of the ball nut 2 has a through hole 5, which is formed in the shape of a rectangle elongated in the direction of the axis of the threaded shaft 1 and having semi-circular shapes on both ends. A deflector 4 is put in the through hole 5. This deflector has one or more ball circulation paths (also referred to as circuits) 4a on the surface facing the threaded shaft 1 so that said plurality of balls 3 may be rotated and properly led to circulate through the spiral clearance between the ball thread grooves 1b and 2b. Each ball circulation groove 4a is substantially S-shaped. The balls 3 are led by the ball circulation grooves 4a so as to pass over the peripheral surface (the lands of the ball threads) 1a of the threaded shaft 1 onto the adjacent ball thread grooves 1b. Thus, the balls 3 are returned to the ball thread grooves 1b which they have been led through, and are circulated through the clearance between the ball thread grooves 1b of the threaded shaft 1 and the ball thread grooves 2b of the ball nut 2. Though the deflector 4 shown in FIG. 4 is of the three circuit type, the deflector 4 may have more or less ball circulation paths, if preferable, according to restrictions in design.

The deflector 4 of this embodiment is attached to the device as follows.

Figure 6:
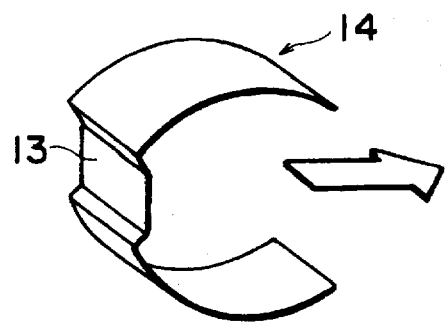
FIG. 6 is a perspective view showing the deflector-locking spring of FIG. 1.

The elongated round through hole 5 formed in the main body of the ball nut 2 has a flat bearing surface 11 projected inward from the rim of the through hole 5 in order to position the deflector 4. The deflector 4 has a contact surface 4b which juts out around the top surface of the deflector 4 in order to come into contact with said bearing surface 11. Further, a relatively shallow constriction 12 is formed around the outer peripheral surface of the ball nut 2. This constriction has a width a little narrower than the length of the deflector 4 as well as the through hole 5. The constriction 12 is arranged to span the opening of the through hole 5. A deflector-locking spring 14 is a thin plate spring having a substantially C-shaped cross section with a ditch-like concave portion 13. The C-shaped section has about a 90 degree opening and the ditch-like portion 13 has a flat part as shown in FIG. 6. In order to fix the deflector 4, the deflector 4 is put in the through hole 5 and then the deflector-locking spring 14 is fitted onto the constriction 12 around the ball nut 2.

The flat part of the ditch-like portion 13 of the deflector-locking spring 14 thus fitted around the ball nut 2 comes into area contact with the outer, or top surface 4c of the deflector 4 and presses it toward the threaded shaft 1. Thus, the deflector 4 is mechanically urged into the through hole 5 and fixed to the ball nut 2. Such fixation is very reliable and can be executed in an instant. As a result, the assembly time of the ball screw can be reduced and productivity can be remarkably improved. It is also very easy to detach the deflector 4 from the ball nut 2, just by pulling out the deflector-locking spring 14 from the ball nut 2. In addition, as the deflector-locking spring 14 is received in the constriction 12 of the ball nut 2 so as not to project outward from the outer peripheral surface of the ball nut 2, the deflector-locking spring 14 does not interfere with the inner surfaces of the housing of the ball nut 2. At the same time, when the device is contained in the housing the ditch-like portion 13, which can not come out from the through hole 5, prevents the rotation of the deflector-locking spring 14 without fail. The deflector-locking spring 14 is made of a thin plate preferably having a thickness of 0.5 to 1.0 mm.

Figure 7:
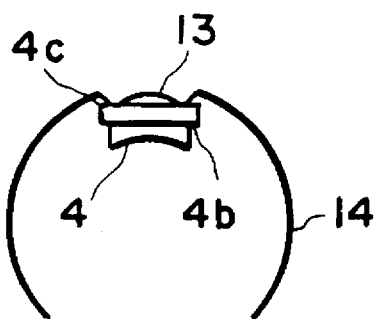
FIG. 7 is a front view showing a deflector and a deflector-locking spring of another embodiment according to the present invention.

FIG. 7 shows another embodiment according to the present invention.

This embodiment differs from the first embodiment in that a corrugated portion 13 is formed, instead of the above-mentioned ditch-like portion 13, in the middle of the deflector-locking spring 14. Accordingly, the corrugated portion 13, which comes in line contact with the top surface 4c of the deflector 4, pushes the deflector 4 toward the threaded shaft 1. As the corrugated portion 13 comes into line contact with the top surface 4c along both longitudinal edges of the top surface 4c, the deflector 4 in the through hole 5 is strongly pressed. Also, well-balanced pressure can be given to the deflector 4. As a result, in addition to the above-mentioned effects of the first embodiment, this embodiment can realize more stable fixation of the deflector 4 than the first embodiment.

Figure 8:
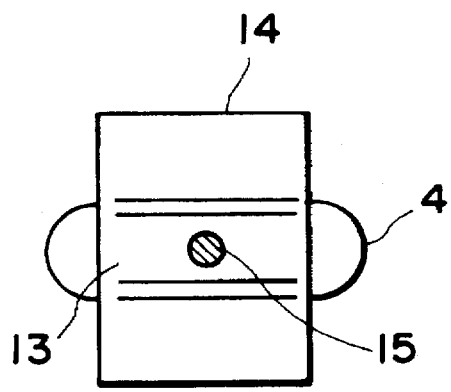
FIG. 8 is a plan view showing a deflector and a deflector-locking spring of still another embodiment according to the present invention.
Figure 9:
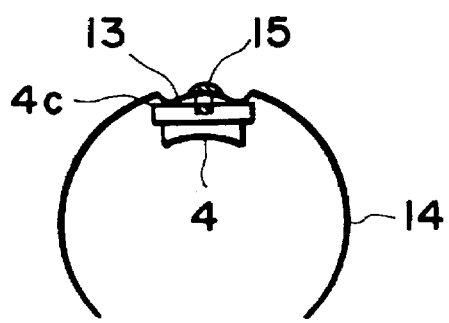
FIG. 9 is a front view of the component shown in FIG. 8.

FIGS. 8 and 9 show still another embodiment according to the present invention.

This embodiment differs from the above-mentioned two embodiments in that the concave portion 13 in the middle of the deflector-locking spring 14 is not only pressed against but also fixed to the deflector 4 to form a unit (a deflector device). The concave portion 13 may be fixed with a rivet 15 as shown in FIGS. 8 and 9, or with a machine screw. Also, heat welding, bonding, and so on may be used to fix the concave portion 13 to the deflector 4. More specifically, a deflector 4 which is made of synthetic resin and provided with one or more small protrusions on the top surface can be fixed to a concave portion 13 which has one or more small holes corresponding to the respective protrusions by heating and flattening the protrusions received in and projecting from the small holes. The deflector 4 and the deflector-locking spring 14 may be made of metal(s) so that they can be welded. The deflector 4 can be fixed to the concave portion 13 of the deflector-locking spring 14 with an adhesive properly selected according to the materials of the deflector 4 and the deflector-locking spring 14. In this case, since the deflector 4 is not fixed in the through hole 4 only with adhesive, as in the conventional art, the deflector 4 fixed to the deflector-locking spring 14 can be attached to and detached from the ball nut 2 in an instant.

Figure 10:
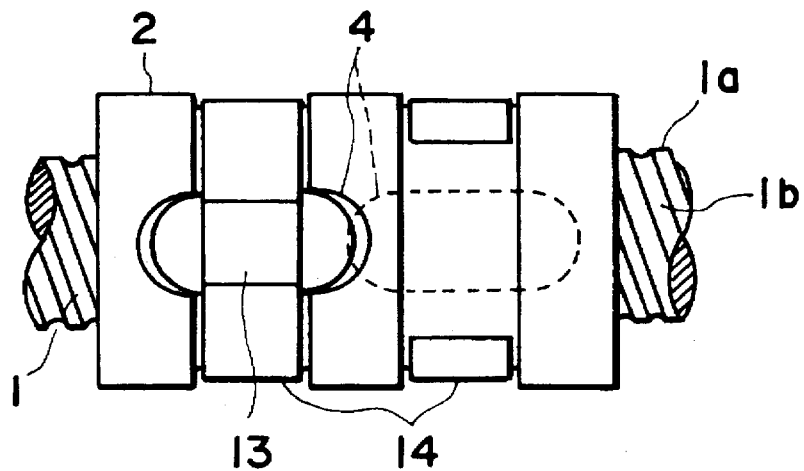
FIG. 10 is a plan view showing another embodiment according to the present invention.
Figure 11:
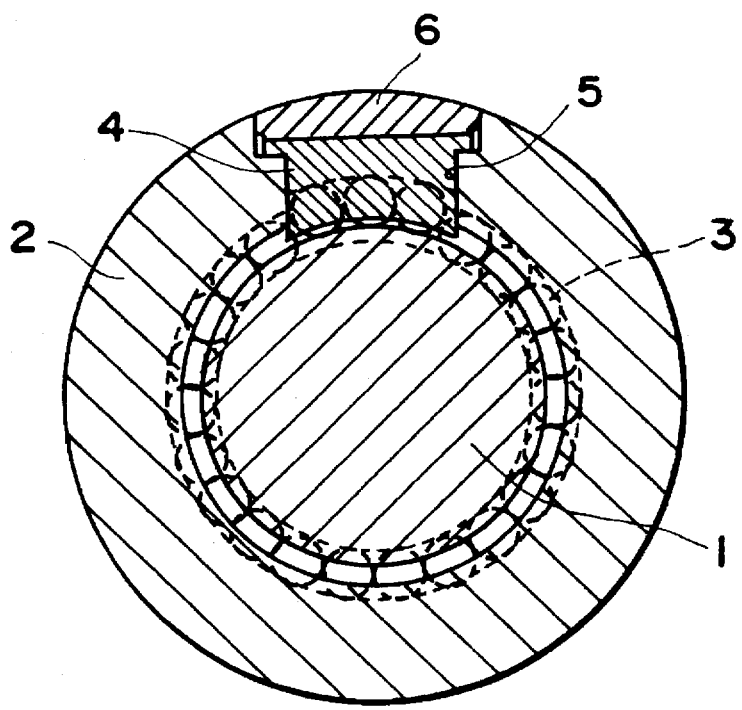
FIG. 11 is a cross-sectional view showing a typical example of an internal-circulation-type ball screw device.

FIG. 10 shows still another embodiment according to the present invention.

This embodiment differs from the first embodiment in that the ball nut 2 is provided with two deflectors 4. Two deflectors 4 are arranged rotation-symmetrically around the axis of the ball nut 2, as viewed in a cross-section of the ball nut 2. These two deflectors 4 are also arranged so that they deviate from each other in the axial direction of the ball nut 2 as shown in FIG. 10. The deflectors 4 are, as described before, fixed to the ball nut 2 by fitting the deflector-locking springs 14 onto the constrictions 12 around the outer peripheral surface of the ball nut 2.

The deflector-locking springs used in this embodiment may be replaced by those used in the second and third embodiments. Of course, the ball nut 2 may have more than two deflectors 4.

Though, in the above-mentioned embodiments, the ball screw devices employ typical ball nuts 2 without flanges, the fixation of the deflectors 4 and the construction concerning the fixation can be applied regardless of whether flanges, sealing members and/or preload systems are employed or not. Any type of preload system can be used in the device without hindering the effects of the present invention.

As described above in detail, the internal-circulation-type ball screw device according to the present invention has one or more deflectors, each of which is put in the through holes of the ball nut and fixed to the ball nut by fitting the deflector-locking spring onto the constriction formed around the outer peripheral surface of the ball nut. The constriction is formed so as to span the opening of the through hole, and the deflector-locking spring is a thin plate spring having a substantially C-shaped cross section with a ditch-like portion or a corrugated portion in the middle corresponding to the through hole. Therefore, the top surface of the deflector in the through hole is pushed in toward the threaded shaft by the ditch-like or corrugated portion of the deflector-locking spring. Thus, the deflector can be fixed to the ball nut, in an instant, which reduces assembly time of the ball screw device. Accordingly, internal-circulation-type ball screw devices with simple construction and good productivity can be obtained.

When the second embodiment according to the present invention is adopted, more stable fixation of the deflector can be realized in addition to the above-mentioned effects. Also, when the third embodiment in which the deflector is fixed to the deflector-locking spring is adopted, attachment and especially detachment of the deflector together with the deflector-locking spring can be carried out more easily.

What is claimed is:

1. An internal-circulation-type ball screw device, comprising:

a threaded shaft having a peripheral surface formed with ball thread grooves;

a ball nut having an inner peripheral surface formed with ball thread grooves facing said ball thread grooves of the threaded shaft, the ball nut having a substantially radially extending through hole with sidewall portions spaced circumferentially of the ball nut;

a plurality of balls engaged in a clearance between said ball thread grooves of the ball nut and said ball thread grooves of the threaded shaft;

a deflector set in said through hole to guide and circulate said plurality of balls; and a deflector-locking spring including a thin plate spring having a substantially C-shaped cross section, said thin plate spring having a radially inwardly extending portion disposed substantially midway between ends of the C-shaped cross section and received in said through hole between said sidewall portions, said radially inwardly extending portion contacting the deflector and pressing the deflector toward the threaded shaft to fix the deflector to the ball nut.

2. An internal-circulation-type ball screw device according to claim 1, wherein said radially inwardly extending portion of said deflector-locking spring is a corrugated portion.

3. An internal-circulation-type ball screw device according to claim 1, wherein said radially inwardly extending portion of the deflector-locking spring contacts an outer surface of the deflector.

4. An internal-circulation-type ball screw device according to claim 1, wherein the ball nut includes a recess formed in an outer peripheral surface thereof and the deflector-locking spring is received in the recess.

5. An internal-circulation-type ball screw device according to claim 4, wherein the deflector-locking spring is accommodated substantially entirely in the recess and does not protrude from the outer peripheral surface of the ball nut.

6. An internal-circulation-type ball screw device, comprising:

a threaded shaft having a peripheral surface formed with ball thread grooves;

a ball nut having an inner peripheral surface formed with ball thread grooves facing said ball thread grooves of the threaded shaft, the ball nut having a recess formed in an outer peripheral surface thereof and a substantially radially extending through hole;

a plurality of balls engaged in a clearance between said ball thread grooves of the ball nut and said ball thread grooves of the threaded shaft; and a deflector device mounted on said ball nut, wherein said deflector device includes a deflector set in said through hole to guide and circulate said plurality of balls and a deflector-locking spring including a thin plate spring having a substantially C-shaped cross section which embraces said outer peripheral surface of the ball nut, with a portion disposed substantially midway between ends of the C-shaped cross section affixed to and forming a unit with the deflector and pressing the deflector toward the threaded shaft to fix the deflector to the ball nut, the deflector-locking spring being accomodated substantially entirely in said recess of the ball nut so as not to protrude from the outer peripheral surface of the ball nut.

7. An internal-circulation-type ball screw device according to claim 6, wherein said portion of the deflector-locking spring is a corrugated portion.

8. An internal-circulation-type ball screw device according to claim 6, wherein said portion of the deflector-locking spring is deformed radially inwardly.

* * * * *